(12) United States Patent
Jacob et al.

(10) Patent No.: US 9,113,705 B1
(45) Date of Patent: Aug. 25, 2015

(54) ADJUSTABLE SHELVING ASSEMBLY AND THE METHOD THEREOF

(71) Applicant: Wipro Limited, Bangalore (IN)

(72) Inventors: Jejju Jacob, Chennai (IN); Puneet Makkar, Krishna Nagar (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/258,830

(22) Filed: Apr. 22, 2014

(30) Foreign Application Priority Data

Mar. 10, 2014 (IN) ............................ 1244/CHE/2014

(51) Int. Cl.
  *F25D 23/00* (2006.01)
  *A47B 57/06* (2006.01)
  *F25D 25/02* (2006.01)

(52) U.S. Cl.
  CPC ................ *A47B 57/06* (2013.01); *F25D 23/00* (2013.01); *F25D 25/02* (2013.01)

(58) Field of Classification Search
  CPC ........ A47B 21/02; A47B 57/06; A47B 57/08; A47B 57/10; A47B 57/30; A47B 57/32; A47B 57/34; F25D 2325/021; F25D 2500/02; F25D 23/00; F25D 25/02
  USPC .......... 108/144.11, 146, 147.11, 147.16, 106, 108/108; 312/408
  See application file for complete search history.

(56) References Cited

U.S. PATENT DOCUMENTS

| | | | |
|---|---|---|---|
| 5,199,778 A * | 4/1993 | Aoki et al. ..................... | 312/408 |
| 5,913,584 A * | 6/1999 | Swindell et al. ............... | 312/408 |
| 2002/0124777 A1* | 9/2002 | Lag ................................ | 108/20 |
| 2008/0246382 A1* | 10/2008 | Kang et al. ..................... | 312/408 |
| 2009/0084914 A1* | 4/2009 | Picken et al. ................. | 248/206.5 |
| 2009/0255292 A1* | 10/2009 | Benz .............................. | 62/378 |
| 2010/0060124 A1* | 3/2010 | Kang et al. ..................... | 312/408 |
| 2010/0060125 A1* | 3/2010 | Kang et al. ..................... | 312/408 |
| 2010/0117502 A1* | 5/2010 | Kang et al. ..................... | 312/408 |
| 2010/0171402 A1* | 7/2010 | Yoon .............................. | 312/408 |
| 2010/0176703 A1* | 7/2010 | Kim ................................ | 312/408 |
| 2014/0252939 A1* | 9/2014 | Tunzi ............................. | 312/408 |
| 2015/0023000 A1* | 1/2015 | Kendall et al. ................. | 362/92 |

* cited by examiner

*Primary Examiner* — Daniel Rohrhoff
(74) *Attorney, Agent, or Firm* — LeClairRyan, a Professional Corporation

(57) ABSTRACT

An adjustable shelving assembly includes at least two support rails, at least one geared rack provided in each of the at least two support rails, and an actuating mechanism placed adjacent to the at least one geared rack. The actuating mechanism is configured to support at least one shelf and facilitates movement of the at least one shelf along the at least two support rails. The actuating mechanism includes a pinion mating with the at least one geared rack, a plurality of permanent magnets mounted coaxially inside the pinion, ferromagnetic disks provided on either ends of the pinion, and a shaft placed axially in the pinion, connecting the permanent magnets. The permanent magnets magnetize or demagnetize the ferromagnetic disks when the shaft is rotated for locking or unlocking the at least one shelf.

10 Claims, 3 Drawing Sheets

ADJUSTABLE SHELVING ASSEMBLY AND THE METHOD THEREOF

This application claims the benefit of Indian Patent Application No. 1244/CHE/2014 filed Mar. 3, 2014, which is hereby incorporated by reference in its entirety.

FIELD

The present disclosure relates to a shelving mechanism. In particular, embodiments of the present disclosure relates to an apparatus and method for adjusting a shelf of a storage unit.

BACKGROUND

Shelves are part of storage units found and used in a variety of domestic and industrial applications. Shelves are generally horizontally placed surfaces which are used for displaying, storing, or supporting an entity or plurality of entities. Shelves also act as an aesthetic aspect of many interior designs for houses and as a support structure to display valuable entities to the customer in shops.

In many domestic and industrial storage units including, but not limiting to, cupboards, shoe racks, refrigerators, inventory storage, supermarkets, grocery stores etc., shelves are used to store and display the entities. For example, in refrigerators, there are a number of shelves installed in various levels so as to divide the refrigerator compartment for storing food and other utensils. Shelving also helps in compartmentalizing the refrigerator compartment to freezer, meat storage, greens storage etc. Since, the refrigerator compartment has a space constraint; it is of at most importance for the manufacturers to compartmentalize the different sections of the refrigerator efficiently. Many of the refrigerators used for domestic purposes utilize shelves to compartmentalize the refrigerator for storing purposes.

In conventional refrigeration systems, shelves are installed in slots provided on the inner cabin of the refrigerator. If the user has to adjust the shelves to increase or decrease the space in a particular compartment, the entities stored over the shelf has to be removed and then the shelf has to be re-slotted. In many of the refrigerators, the slots provided are only at certain heights and these shelves have to be placed at these slots. The user cannot move the shelf to any desired location or adjust the height of the shelf based on his needs. In order to adjust the height of the shelves within the refrigerator, the user has to remove these shelves and slot them in the provisioned slots. Moreover, removing and placing the entities stored on the shelves for re-slotting the shelves may be an inconvenient task to the user.

Hence, there is a need for an adjustable shelving assembly to provide easiness and versatility in adjusting the shelves of the storage units at any desired height and without removing any of the entities placed on the shelves.

SUMMARY

The shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is an assembly for providing easiness and versatility in an adjustable shelving assembly. The adjustable shelving assembly comprises at least two support rails and at least one geared rack which is provided in each of the at least two support rails and an actuating mechanism placed adjacent to the at least one geared rack, the actuating mechanism configured to support at least one shelf and facilitates movement of the at least one shelf along the at least two support rails; wherein the actuating mechanism comprising: a pinion mating with the at least one geared rack, a plurality of permanent magnets mounted coaxially inside the pinion, ferromagnetic disks provided on either ends of the pinion, and a shaft placed axially in the pinion, connecting the permanent magnets, such that the permanent magnets magnetizes or demagnetizes the ferromagnetic disks when the shaft is rotated for locking or unlocking the at least one shelf.

In an aspect of the present disclosure, the at least one shelf comprises a frame, a link assembly and a handle mounted at a fore end of the frame; a plurality of links connected to the handle and the shaft of the actuating mechanism, such that actuation of handle rotates the shaft through the plurality of links for locking or unlocking the at least one shelf.

In an aspect of the present disclosure, a method of adjusting height of at least one shelf of the shelving assembly as claimed in claim 1, the method comprising acts of: demagnetizing the ferromagnetic disk for unlocking the at least one shelf and facilitating movement thereof, wherein the ferromagnetic disk is demagnetized by rotating the shaft in one direction; magnetizing the ferromagnetic disk for locking the at least one shelf and arresting movement thereof, wherein the ferromagnetic disk is magnetized by rotating the shaft in other direction.

It is to be understood that the aspects and embodiments of the invention described above may be used in any combination with each other. Several of the aspects and embodiments may be combined together to form a further embodiment of the disclosure.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Figure 1:
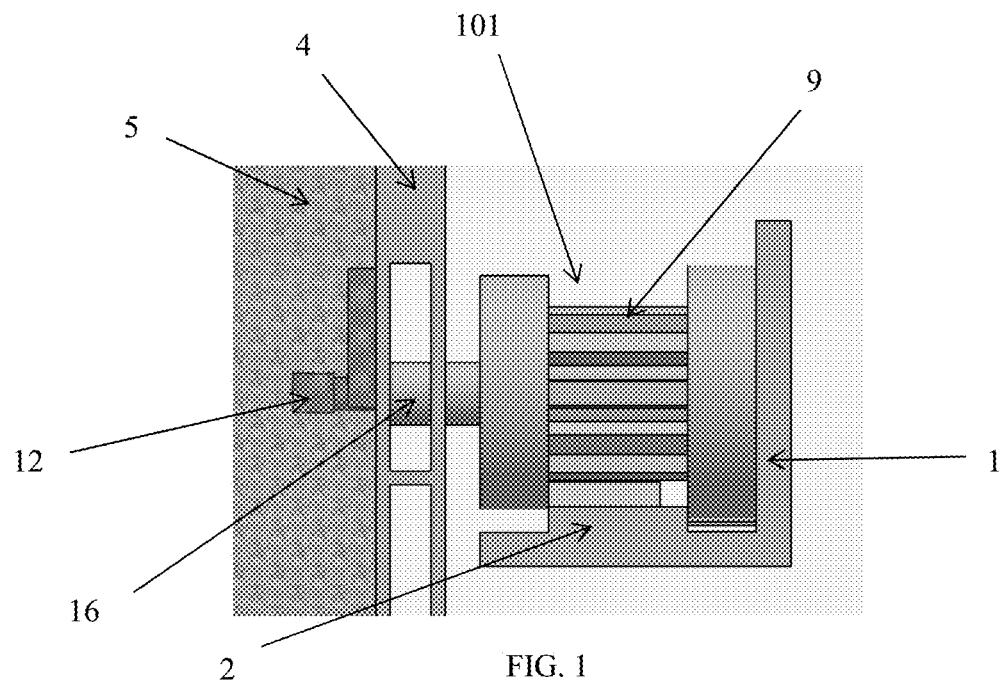
FIG. 1 is a top view of an example of an actuation mechanism installed in each of at least two support rails.

FIG. 1 illustrates the actuation mechanism 101 installed in each of the at least two support rails 1 in accordance with some embodiments of the present disclosure. The actuation mechanism 101 is geared onto a geared rack 2 which is fixed adjacent to the at least two support rails 1. The geared rack 2 is formed by indexing a plurality of gears onto a flat rack. The outer surface of the actuation mechanism 101 has a pinion 9 which is mated onto the geared rack 2. The pinion 9 has gears, which are indexed such that, the gears of the pinion 9 mesh with the gears provided on the geared rack 2. This meshing of gears of the pinion 9 to the geared rack 2 enables movement, for example longitudinal movement of the actuation mechanism 101 within the at least two support rails 1.

The at least two support rails 1 (best shown in FIG. 5) are placed adjacent to the geared rack 2. The at least two support rails 1, guides the actuation mechanism 101 fixed onto the geared rack 2. The actuation mechanism 101 moves over the geared rack 2 wherein, the ferromagnetic disk 11 provided on the support rail side end is in contact with the at least two support rails 1. A shaft 12 is provided on the central axis of the pinion 9, whose one end is fixed to the link assembly 13 of the at least one shelf 3 (not shown in figure).

The at least one shelf 3 comprises a frame 4 which supports a platform 5 for supporting the entities placed on the at least one shelf 3. The frame 4 of the at least one shelf 3 rests on the shaft housing 16 which takes up the load of the at least one shelf 3. The shaft housing 16 is housed over the shaft 12 wherein, the frame 4 of the at least one shelf 3 is in contact with the shaft housing 16 which acts as a load bearing member.

Figure 2:
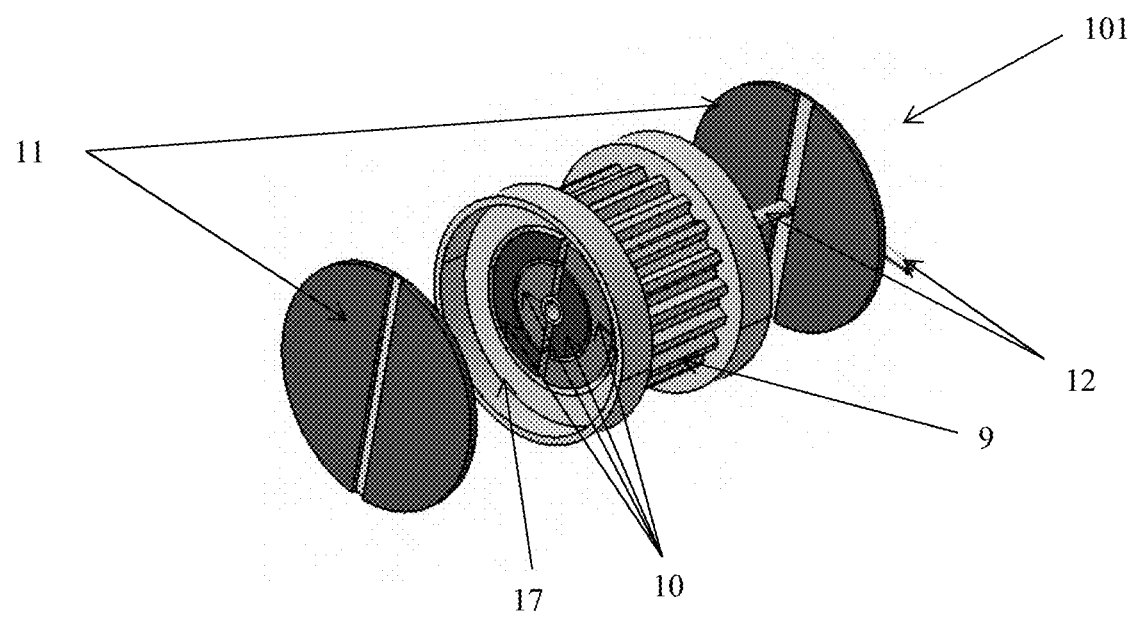
FIG. 2 is an exploded perspective view of an actuation mechanism in accordance with some embodiments of the present disclosure.

FIG. 2 illustrates exploded view of the actuation mechanism 101 in accordance with some embodiments of the present disclosure. The actuation mechanism 101 has a pinion 9 indexed with gears on its outer surface. The actuation mechanism 101 has a central cavity 17 which houses the shaft 12 and permanent magnets 10. The permanent magnets 10 are housed within the central cavity 17 around the shaft 12. The polarities of the permanent magnets 10 housed within the central cavity 17 are such that, the north pole magnets and the south pole magnets are arranged one after the other or vice versa. By arranging the permanent magnets 10 in alternate polarities, one after the other, aids in magnetizing and demagnetizing the ferromagnetic disk 11 provided on the support rail side end when the shaft 12 is rotated.

Ferromagnetic disks 11 are fixed on either ends of the actuator mechanism 101 which magnetize and demagnetize when the shaft 12 is rotated. One of the ferromagnetic disks 11 is fixed on the support rail side end and the other is provided on the shaft side end. The ferromagnetic disks 11 have a central slot provided which constitutes non-ferromagnetic material. One of the purposes of the ferromagnetic disk 11 is to capture the magnetic flux generated by the permanent magnets 10 which magnetizes or demagnetizes the ferromagnetic disks 11. The ferromagnetic disk 11 provided on the support rail side end, when magnetized, gets attracted to the at least two support rails 1. The magnetism generated by the permanent magnets 10 firmly locks the entire actuation mechanism 101 to the at least two support rails 1. When the ferromagnetic disk 11 provided on the support rail side end is demagnetized, the ferromagnetic disk 11 unlocks from the at least two support rails 1 and moves longitudinally along the at least two support rails 1. The shaft 12 provided along the central axis of the actuation mechanism 101 passes through the ferromagnetic disk 11 provided on the shaft 12 side end of the actuator mechanism 101.

Figure 3:
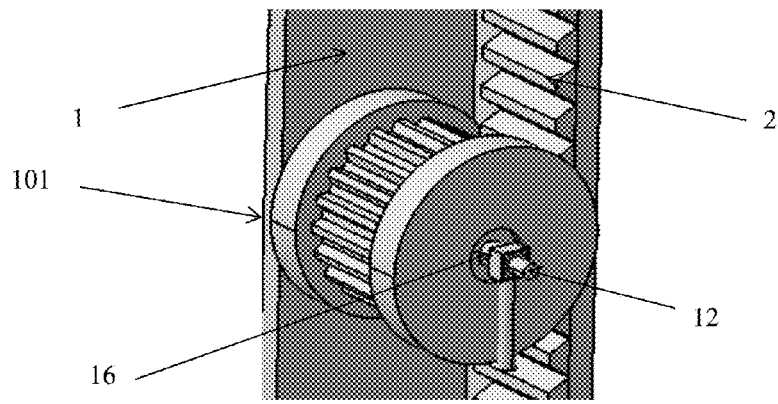
FIG. 3 illustrates perspective view of the actuation mechanism engaged onto the geared rack in accordance with some embodiments of the present disclosure.

FIG. 3 illustrates perspective view of the actuation mechanism 101 engaged onto the geared rack 2 in accordance with some embodiments of the present disclosure. The actuation mechanism 101 is geared onto the geared rack 2 which is fixed adjacent to the at least two support rails 1. The ferromagnetic disk 11 fixed on the shaft side end has a shaft 12 at the central axis which is further fixed to the link assembly 13 of the at least one shelf 3. The link assembly 13 comprises a handle 14 for actuation and plurality of links 15 fixed to the handle and the shaft 12. The ferromagnetic disk 11 provided on the support rail end is in contact with the at least two support rails 1 so as to fix onto the at least two support rails 1 as the ferromagnetic disk 11 is magnetized or demagnetized when the shaft 12 is rotated by the link assembly 13.

The shaft 12 is further fixed to a plurality of links 15 of the link assembly 13 which is used to actuate the rotation of the shaft 12. The link assembly 13 is fixed to a plurality of links 15 which transfers the actuated motion from the handle 14 upon actuation by the user.

Figure 4:
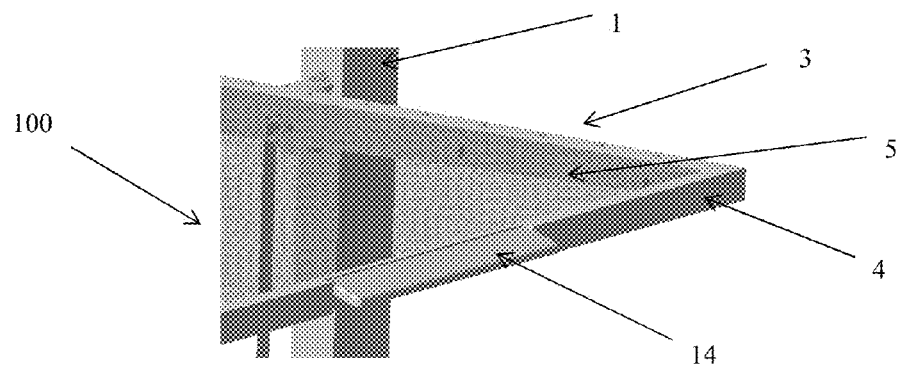
FIG. 4 illustrates an adjustable shelf of the present disclosure in accordance with some embodiments of the present disclosure.

FIG. 4 illustrates an exemplary adjustable shelving assembly 100 of the present disclosure in accordance with some embodiments of the present disclosure. The at least one shelf 3 in the present disclosure comprises a frame 4 which houses a platform 5. The platform 5 is made up of durable materials such as but not limited to glass, Fiber reinforced plastic (FRP), wood, non-ferromagnetic materials etc., which can withstand heavy loads and stresses. The at least one shelf 3 in the present disclosure has a fore end 6, aft end 7 and side walls 8 forming a rectangular shaped shelf (best shown in FIG. 5). The handle 14 of the link assembly 13 is provided at the fore end 6 for actuation. The link assembly 13 has plurality of links 15 connected to each other and are housed along the fore end 6 and the side walls 8 of the at least one shelf 3. The plurality of links 15 are fixed to the handle 14 and the other end of the plurality of the links 15 are fixed to the shaft 12. The plurality of links 15 transfers the force generated on the handle 14 by the user onto the shaft 12 for rotation. The side walls 8 of the shelf 3 are designed so as to rest onto the shaft housing 16 of the actuation mechanism 101.

Figure 5:
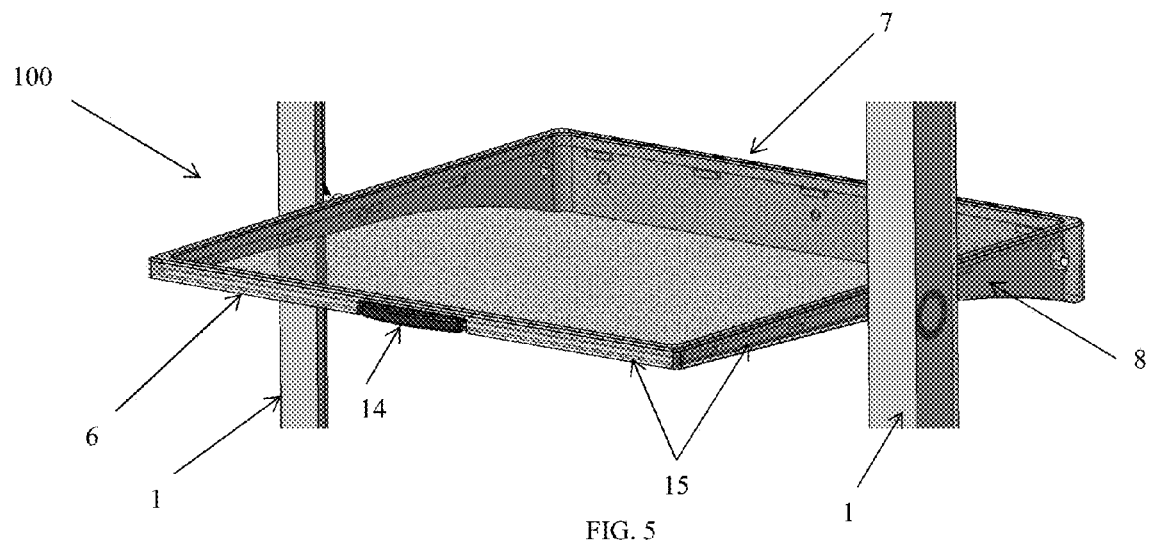
FIG. 5 illustrates perspective view of the adjustable shelving assembly in accordance with some embodiments of the present disclosure.

FIG. 5 illustrates perspective view of the adjustable shelving assembly 100 in accordance with some embodiments of the present disclosure. The shelf 3 is supported onto the at least two support rails 1. The at least one shelf 3 comprises the fore end 6 which has the handle 14 used for actuation in order to move the shelf 3 longitudinally along the at least two support rails 1. The side walls 8 of the shelf 3 comprise a plurality of links 15 which are fixed to the handle and the shaft 12. When the handle 14 is actuated in an upward direction, the plurality of links 15 connected to the handle 14 actuate the shaft 12 so as to rotate the permanent magnets 10 in one direction which demagnetizes the ferromagnetic disk 11 provided on the support rail 1 side end. Once the ferromagnetic disk 11 is demagnetized, the actuation mechanism 101 moves longitudinally along the geared rack 2. The user can adjust the height of the shelf 3 at any desired position. When the handle 14 is actuated in a downward direction, the plurality of links 15 connected to the handle 14 actuate the shaft 12 which rotates the permanent magnets 10 in another direction which magnetizes the ferromagnetic disk 11 provided on the support rail 1 side end. Once the ferromagnetic disk 11 is magnetized, the movement of the actuation mechanism 101 is arrested onto the at least two support rails 1 due to the magnetism generated by the permanent magnets 10 housed within the central cavity 17 of the actuation mechanism 101.

The user on actuation of the handle 14 in an upward direction demagnetizes the support rail 1 side ferromagnetic disk 11. The user has to hold the bottom of the shelf 3 in order to provide additional support during the longitudinal movement of the shelf 3.

In an embodiment of the present disclosure, the at least two support rails 1 are placed apart from each other in a vertical or substantially vertical orientation. As used herein, the phrase substantially vertical means that or refers to, the at least two support rails 1 configured to have an orientation angle of approximately ranging from 0° to 90° with vertical plane.

In an embodiment of the present disclosure, the at least one shelf 3 is placed horizontal or substantially horizontal to the at least two support rails 1. As used herein, the phrase substantially horizontal means that or refers to, the at least one shelf 3 configured to have an orientation angle of approximately ranging from 0° to 90° with horizontal plane.

Figure 6:
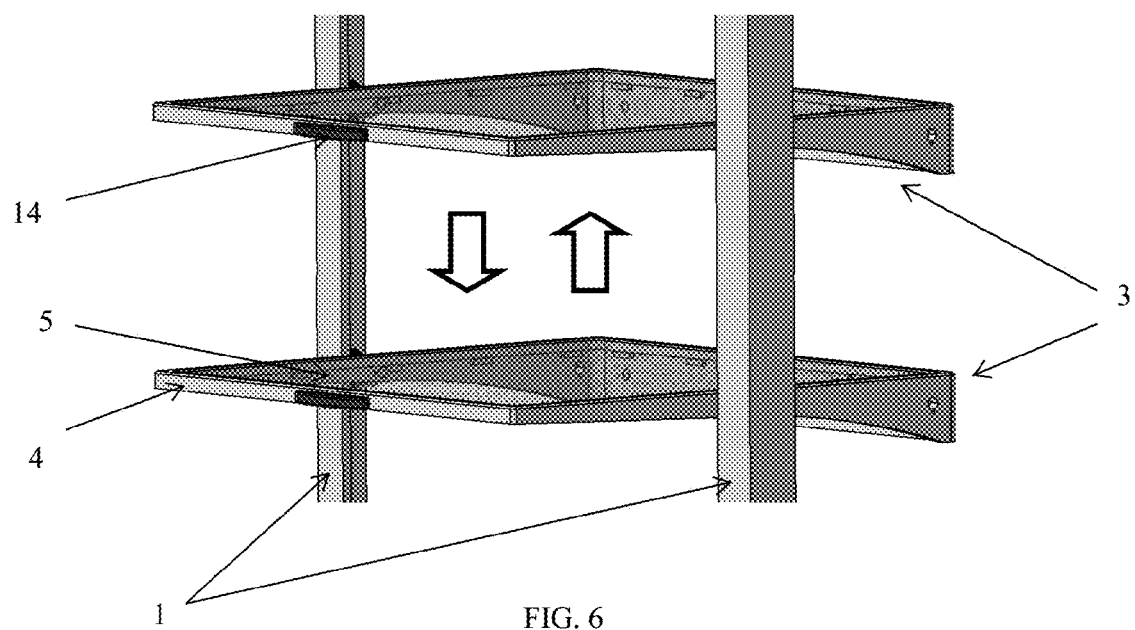
FIG. 6 illustrates direction of adjustment of the shelves in accordance with some embodiments of the present disclosure.

FIG. 6 illustrates direction of adjustment of the at least one shelf 3 in accordance with some embodiments of the present disclosure. The fore end 6 of the at least one shelf 3 comprises the link assembly 13 having the handle 14 and plurality of links 15 which actuates the rotation of the permanent magnets 10 housed within the central cavity 17 of the actuation mechanism 101. Actuation of the handle 14 in an upward direction demagnetizes the support rail side ferromagnetic disk 11 which aids in longitudinal movement of the shelf 3 in the at least two support rails 1. From the FIG. 6, the at least one shelf 3 can be moved in an upward or downward direction based on the user's requirement. The user can also lock or arrest the movement of the at least one shelf 3 at any height by just moving the handle 14 downward which magnetizes the ferromagnetic disk 11 provided on the support side end.

In one embodiment of the present disclosure, the movement of the shelf 3 can be moved in a longitudinal direction, horizontal direction, lateral direction and vertical direction.

In an embodiment of the present disclosure, the adjustable shelving assembly 100 finds its application use in refrigerators, book shelves, storage racks, shoe racks, inventory storage rooms, storage cabinets, cupboards or etc.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An adjustable shelving assembly, comprising:
at least two support rails;
at least one geared rack provided in each of the at least two support rails; and an actuating mechanism placed adjacent to the at least one geared rack, the actuating mechanism configured to support at least one shelf and facilitates movement of the at least one shelf along the at least two support rails, the actuating mechanism further comprising:
  a pinion mating with the at least one geared rack;
  a plurality of permanent magnets mounted coaxially inside the pinion;
  ferromagnetic disks provided on either ends of the pinion; and
  a shaft placed axially in the pinion, connecting the permanent magnets that magnetize or demagnetize the ferromagnetic disks when the shaft is rotated for locking or unlocking the at least one shelf.

2. The adjustable shelving assembly as claimed in claim 1, wherein the at least one shelf comprises a frame, a link assembly and a handle mounted at a fore end of the frame, a plurality of links connected to the handle and the shaft of the actuating mechanism, such that actuation of handle rotates the shaft through the plurality of links for locking or unlocking the at least one shelf.

3. The adjustable shelving assembly as claimed in claim 1, wherein the ferromagnetic disks provided on either end of the pinion is in contact with the at least two support rails.

4. The adjustable shelving assembly as claimed in claim 2, wherein actuating the handle of the link assembly in an upward direction, rotates the shaft fixed to the permanent magnets which demagnetizes the ferromagnetic disk for unlocking the at least one shelf.

5. The adjustable shelving assembly as claimed in claim 2, wherein actuating the handle of the link assembly in a downward direction, rotates the shaft fixed to the permanent magnets which magnetizes the ferromagnetic disk for locking the at least one shelf.

6. The adjustable shelving assembly as claimed in claim 1, wherein the at least two support rails are placed apart from each other in a vertical or substantially vertical orientation.

7. The adjustable shelving assembly as claimed in claim 1, wherein the at least one shelf is placed horizontal or substantially horizontal to the at least two support rails.

8. A method of adjusting height of at least one shelf of the shelving assembly as claimed in claim 1, the method comprising:
  demagnetizing the ferromagnetic disk for unlocking the at least one shelf and facilitating movement thereof, wherein the ferromagnetic disk is demagnetized by rotating the shaft in one direction; and
  magnetizing the ferromagnetic disk for locking the at least one shelf and arresting movement thereof, wherein the ferromagnetic disk is magnetized by rotating the shaft in other direction.

9. The method as claimed in claim 8, wherein the shaft is rotated by actuating a handle of a link assembly.

10. A refrigerator comprising the adjustable shelving assembly as claimed in claim 1.

* * * * *